Dec. 25, 1956    A. H. DAVIS    2,775,022
SILICEOUS STRAND
Original Filed Oct. 23, 1950
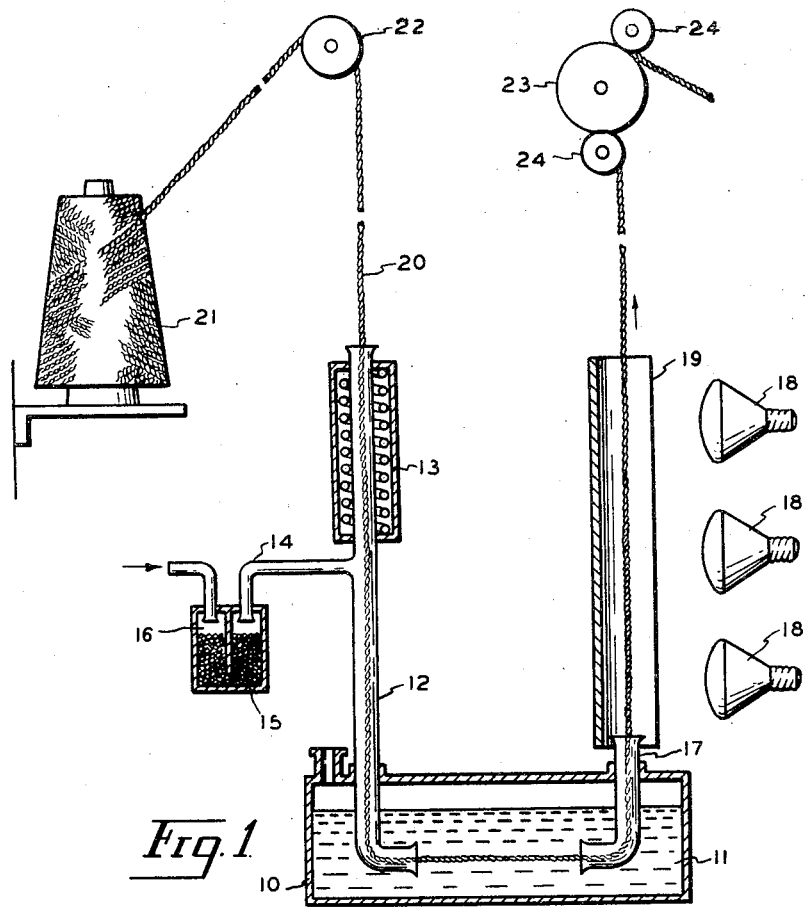
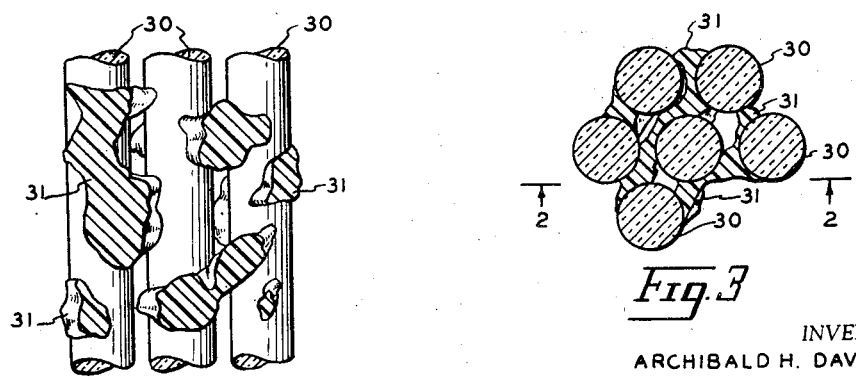
INVENTOR
ARCHIBALD H. DAVIS

United States Patent Office 2,775,022
Patented Dec. 25, 1956

2,775,022

SILICEOUS STRAND

Archibald H. Davis, Silver Spring, Md.

Original application October 23, 1950, Serial No. 191,595. Divided and this application May 18, 1953, Serial No. 355,657

3 Claims. (Cl. 28—81)

This invention relates to artificial fibers and filaments, particularly strands of glass fibers and filaments, and the internal treatment of the strands to provide a high order of improvement in physical properties and resistance to chemical and biological attack. The word fiber as used hereinafter is intended to include filaments, a continuous or longer form of fiber.

A general object of the invention is the provision of artificial fiber strands of increased resistance to internal fiber abrasion and to flex fatigue of the strand.

A further object of the invention is the provision of multifilament artificial fiber strands of increased tensile strength and durability.

Another object of the invention is to provide introduction of an improved binder and lubricant upon the fibers and into the strand for greater resistance to deteriorating forces encountered in use and service, and an improved bonding base for subsequently applied coatings.

Still another object of the invention is to provide a substantially continuous method and apparatus whereby artificial fiber strands are opened and relaxed, cleaned of extraneous material and moisture and treated with an organic plastic composition to provide improved bonding internally and throughout the strand, and separation between the fibers of the strand.

Typically, the method of the invention comprises heating a strand of inorganic fibers, such as glass, mineral wool or asbestos to a temperature sufficient to burn out all extraneous matter, such as moisture, binders and lubricants, thereby loosening and opening up the fibers in the strand, and applying to the loosened strand a liquid organic plastic composition, such as a dispersion of an organic plastic composition in a volatilizable liquid, and thereafter eliminating the liquid from the applied dispersion, whereby the fibers are separated and bonded together by discontinuous elements of organic plastic composition.

Particularly useful in the treatment of the invention are polymerization and co-polymerization products of olefinic compounds, such as vinyl compounds, styrene, acrylic acid and its derivatives, for example, the co-polymerization products of vinyl chloride and vinyl acetate, and the acetals of polyvinyl alcohol. Other compositions useful in the treatment of the invention include synthetic or artificial rubber compositions, such as polymerized dienes and the various modifications thereof, rubber halides and hydrohalides and chloroprene; phenolic resins; cellulose esters and ethers; organo silicon resinous compositions such as the silicones; and mixtures of two or more of such resins or plastics. The plastic compositions may include suitable plasticizers, pigments, fillers and other modifying agents well known in the plastic art.

The plastic composition may be applied to the fiber strands in solution in a suitable organic solvent, or in a suspension or emulsion in a non-solvent or semi-solvent volatile liquid.

It is particularly important that the inorganic fiber strands be opened and thoroughly cleaned by heat directed at all angles within the heat zone which subjects the fibers to heat internally of the strand as well as externally. It is also important to maintain clean surfaces of the fibers, free of moisture film, in order to develop an intimate bond between the applied plastic composition and the surface of the fibers, and to provide bridges or ties of plastic composition between the fibers in the strand. The organic plastic composition thus applied in the opened areas caused by removal of extraneous material on and between the fibers forms separating and bridging elements between the fibers in the form of reticulated networks or discrete elements, and provides a separating and protective cushion for the fibers when the strand is deformed and flexed in service. It is also noteworthy that this plastic composition, adhering to adjacent fibers, provides resilient bridges between variable length or broken fibers and maintains the strength of the strand in tension by the transfer of resistance in bond with other fibers of the strand. The same result may be obtained by maintaining strands, for example, glass fiber strands, spun from molten siliceous composition, in substantially the original heat cleaned and moisture free condition until the plastic composition has been applied thereto.

The plastic composition may be applied to the inorganic fiber strand by passing the strand through a bath comprising a dispersion of the plastic in a volatilizable liquid, or the dispersion may be sprayed upon the strand.

In the drawing Fig. 1 is a diagrammatic representation of an illustrative arrangement of apparatus embodying the principles of the invention;

Fig. 2 is a highly magnified diagrammatic longitudinal section of a typical multifiber strand product of the invention; and Fig. 3 is a highly magnified diagrammatic transverse section of the strand shown in Fig. 2.

In the drawing 10 is a substantially closed container holding a body 11 of a dispersion of a plastic composition in a volatilizable liquid. 12 is an inlet tube, advantageously made of glass, extending below the surface of the plastic dispersion in container 11. At its upper end it is provided with a heater 13, for example, an electric resistance heater, and between the heater and container 10, there is provided a dry air inlet 14 supplying air to tube 12 from drier 15 which may contain a drying material 16 such as calcium chloride or activated alumina. 17 is an outlet tube, which may likewise be made of glass, leading to the solvent release zone, shown by way of example as comprising a bank of infra-red heating lamps 18 and a reflector 19.

In the operation of the apparatus, the artificial fiber strand 20, for example, a multifilament glass fiber strand is drawn from cone 21 over guide pulley 22 and passed under substantially no tension down through tube 12 into the plastic composition bath 11 and out through tube 17 into the solvent release zone. The heater 13 maintains the upper end of the tube 12 at a temperature effective to eliminate moisture from the strand at its rate of travel through the tube, and to vaporize or decompose any lubricating material or other extraneous material which may previously have been applied to the strand. For example, a glass fiber strand may be passed at about 4 inches per second through a heating zone 2½ inches in length maintained at 450° to 550° C. The atmosphere of the heating zone is preferably continuously replaced by dry air or other gas, for example, from drying chamber 16. The replacement may be effected by the thermal draft provided by the heater or the dry gas may be forced into the tube 12 by means of a blower.

The tube section 12 may be omitted from just below the heater 13 to just above the plastic treater 10, in which case it is advantageous to blow a current of dry air across the strand in the open section.

Illustrative of the heat cleaning operation of the invention is the treatment of a 450½ continuous glass filament yarn with an approximate diameter of .0032 inch providing about 22,500 yards per pound. It has 2 plys of 204 filaments per ply and has 4.45 turns per inch. The yarn contains 2.7% by weight of staple binder or lubricant consisting of starch, gelatine, an amine and a neutral oil.

When passed at about 50 feet per minute through a heat cleaner consisting of a resistance wire coil eight inches in length wound on a ⅜ inch diameter "Pyrex" tube, insulated with glass wool and maintained at a temperature of about 530° C., 88% by weight of the binder material is eliminated.

The rate of travel of the yarn through the heat cleaning zone, the length and temperature of the heat cleaning zone and the weight and character of the yarn and binder are all interrelated, so that the rate of travel of the yarn and the temperature of the zone will be adjusted for each type of yarn or other strand material to obtain optimum results.

In the solvent release zone the strand is subjected to a temperature of from about 70° C. to about 180° C. for a period effective to eliminate the solvent or dispersion medium of the bath composition. The weight of the plastic composition deposited on the strand may be controlled by varying the concentration and viscosity of the solvent, and further control may be provided by the use of squeeze rolls or wiping blades (not shown in the drawing) at the point of egress of the strand from the bath. In general, from about 10% to about 50% by weight of the original strand may advantageously be applied, although considerably larger amounts up to 100% have been effectively applied.

The strand leaving the solvent release zone passes over drive pulley 23 with associated riders 24 to a conventional winding mechanism (not shown). The drive pulley is adjusted to limit the tension in the strand to the minimum necessary to progress the strand through the treating operations.

The treatment described above by way of example leaves about 45% of plastic composition (based on the original weight of the strand) on the finished strand, and results in a very substantial increase in resistance to flex fatigue and tensile strength of the strand.

The character of the applied plastic may be varied over a wide range by variation of the concentration and composition of the plastic material, the nature of the liquid medium in which the plastic is dissolved or otherwise dispersed, the method of applying the plastic dispersion, the weight of plastic applied and the temperature and rate of the solvent release operation.

The organic plastic may also be applied to the strand in the form of liquid monomers, or dispersions of polymers in liquid monomers, which are further polymerized in a heating zone corresponding to the solvent release zone shown by way of example in the drawing.

Depending on the looseness of the heat treated strand and the voids thus created and on the character of the plastic dispersion and the conditions of application and of solvent release, the plastic may be present in the treated strand as spaced adhesive ties, a reticulated film or network over the surface of the filaments or as connected or discrete elements distributed in spaced relation over the surface of the filaments. Whether the plastic is continuous or in spaced connected or discrete elements, the body of the plastic substance may be substantially solid or it may have a porous or foamy structure. The surface of the plastic substance may be smooth or rugose, for example, pitted or winkled. When multifilament strands are treated by the method of the invention, the plastic composition layer or elements on the surface of adjacent fibers may be connected by attenuated filaments or films of the plastic material distributed at intervals along the length of the strand.

Particularly effective development of discrete plastic ties on and between the fiber surfaces may be obtained by the use of formulations of two or more resinous materials including materials which are normally incompatible in solution.

An example of such a complex formulation is the following:

| | Parts |
|---|---|
| Polyvinyl butyral | 2.5 |
| Copolymer of vinyl acetate and vinyl chloride | 5.0 |
| Polyvinylidene chloride | 2.5 |
| Phenolic resin | 1.2 |
| Plasticizer | 3.0 |
| Tri phenyl phosphate | 1.5 |
| Solvent: | |
|     Methyl ethyl ketone | 50 |
|     Ethyl acetate | 15 |

The above formula forms a mixture which separates into two liquid phases at room temperature, but at temperatures of about 50° C., the mixture becomes homogeneous and can be applied to glass yarn successfully at a rate of 75 feet per minute. This treatment leaves about 30% of plastic composition (based upon the original weight of the strand) on the finished strand.

When a composition of the foregoing formula has been applied to the filaments of a strand or yarn and solvent is removed by heating, the polyvinyl butyral separates as a discontinuous phase of the composition, and on complete removal of the solvent spaced adhesive ties of polyvinyl butyral are formed which bridge the filaments. These are surrounded by a mixture of the other plastics in the composition which are deposited around the polyvinylbutyral ties on the individual filaments as a coating which protects them against abrasion. The methylethyl ketone serves as a solvent for the copolymer of vinyl acetate and vinyl chloride and for the polyvinylidene chloride; the ethyl acetate is a solvent for the polyvinyl butyral.

The use of any plurality of resins in proportions beyond the limit of their mutual compatibility in the solvent, or solvent mixture present as the last of the solvent is evaporated, results in the formation of discrete particles or reticulated networks of one resin component within the other when the solvent is released. Such particles or networks of one portion of the plastic composition form bridges between the adjacent fibers distributed throughout the strand.

When the complex resin composition described above is applied to the 450½ glass fiber strand previously described in an amount of about 30% based on the original weight of the strand the breaking strength of the strand is increased by 40 to 50% and the resistance to internal flex abrasion is increased to from 30 to 60 times the original value.

In the novel multifiber strand, shown as an illustrative example of the products of the invention in Figs. 2 and 3, 30 represents a portion of the fibers comprised in the strand and 31 represents the plastic separating and bonding elements which unite the fibers of the strand into an interconnected, stress-transferring structure. The plastic may also form a continuous or reticulated base upon the surface of the fibers around the separating and bonding elements 31.

Multiple applications of the same or different plastic compositions may be utilized to obtain improved adhesion combined with any specially desired surface character or resistance to abrasion, erosion, weathering or biological attack. For most purposes, the plastic composition and the conditions of treatment are selected as illustrated in the example, to provide the inorganic filaments of the strand with a continuous, connected or discontinuous coating of a cushioning composition of a high degree of resilience.

The treatment of the invention may be applied to multi-filament strands or fabrics made therefrom in any form whether untwisted, loosely or tightly twisted, interlaced or interbraided into threads, cords, tapes and the like.

This application is a division of my application Serial No. 191,595, filed October 23, 1950, which is a continuation-in-part of my application Serial No. 765,952, filed August 4, 1947, each application now abandoned.

I claim:

1. A flexible strand comprising a plurality of aligned parallel siliceous fibers and a multiplicity of discrete organic plastic elements distributed within and throughout the strand, each of said plastic elements being adherent to a plurality of fibers and said elements maintaining the fibers in spaced relationship and transferring stress from fiber to fiber.

2. The strand of claim 1 in which the fibers are glass.

3. The strand of claim 1 in which the organic plastic elements are composed at least largely of vinyl compounds.

References Cited in the file of this patent

UNITED STATES PATENTS

| | | |
|---|---|---|
| 2,207,158 | Neville et al. | July 9, 1940 |
| 2,215,061 | Alt | Sept. 17, 1940 |
| 2,315,259 | Hyde | Mar. 30, 1943 |
| 2,323,684 | Simison | July 6, 1943 |
| 2,446,119 | White et al. | July 27, 1948 |
| 2,611,718 | Steinman | Sept. 11, 1952 |
| 2,673,824 | Biefeld et al. | Mar. 30, 1954 |